United States Patent [19]
Sato

[11] 3,943,798
[45] Mar. 16, 1976

[54] POWER TRANSMITTING MECHANISM
[75] Inventor: Kenichi Sato, Toyota, Japan
[73] Assignee: Aisin Seiki Kabushiki Kaisha, Japan
[22] Filed: Sept. 24, 1973
[21] Appl. No.: 399,682

[30] Foreign Application Priority Data
Oct. 2, 1972  Japan............................ 47-099195

[52] U.S. Cl................................. 74/682; 74/710
[51] Int. Cl.²........................................ F16H 37/06
[58] Field of Search ......... 74/710, 710.5, 789, 682, 74/695, 700, 750 R, 705

[56] References Cited
UNITED STATES PATENTS

| | | | |
|---|---|---|---|
| 3,021,729 | 2/1962 | Chambers et al................. | 74/682 X |
| 3,109,326 | 11/1963 | Holtan............................. | 74/710 X |
| 3,505,904 | 4/1970 | Williams, Jr...................... | 74/710 X |
| 3,739,647 | 6/1973 | Crooks............................. | 74/682 X |

Primary Examiner—Samuel Scott
Assistant Examiner—Frank H. McKenzie, Jr.
Attorney, Agent, or Firm—Oblon, Fisher, Spivak, McClelland & Maier

[57] ABSTRACT

A power transmitting mechanism for a vehicle includes planetary gear means adapted so as to receive an output torque of a transmission and having power trains of different speed ratios, a differential gear means for distributing the output torque from the planetary gear means to the wheel drive shafts, a chain interposed between both gear means so as to thereby establish a mechanical connection therebetween, and a sprocket wheel disposed upon a ring gear of the planetary gear means and engaged with the chain.

5 Claims, 2 Drawing Figures

POWER TRANSMITTING MECHANISM

BACKGROUND OF THE INVENTION

The present invention relates generally to a power transmitting mechanism for a vehicle, and more particularly to a power transmitting mechanism for a vehicle for transmitting the torque from the vehicle transmission to the wheel drive shafts.

Conventionally, various power transmitting mechanisms have been proposed. Such mechanisms comprise planetary gear means having power trains of different speed ratios for producing various output torques from the transmission and a differential gear means for distributing the output torque of the planetary gear means to the wheel drive shafts. In such mechanisms, however, a connecting means including a chain and a sprocket wheel for mechanically connecting both gear means to each other is arranged and designed independently of both gear means, and this results in large construction costs. Therefore, the limitation in design which must accommodate the power transmitting mechanism within a limited space is substantial.

SUMMARY OF THE INVENTION

Accordingly, it is an object of the present invention to provide an improved power transmitting mechanism for obviating the above-mentioned drawbacks.

Another object of the present invention is to provide an improved power transmitting mechanism wherein planetary gear means having power trains of different speed ratios comprises a sun gear, first and second planetary pinion gears, carriers and a ring gear, the ring gear being provided with a sprocket wheel which meshes with a chain interposed between the planetary gear means and a differential gear means.

Still another object of the present invention is to provide an improved power transmitting mechanism which is simple in construction.

BRIEF DESCRIPTION OF THE DRAWING

Various other objects, features and attendant advantages of the present invention will be more fully appreciated as the same becomes better understood from the following detailed description when considered in connection with the accompanying drawing, wherein.

DETAILED DESCRIPTION OF THE PREFERRED EMBODIMENT

Figure 1:
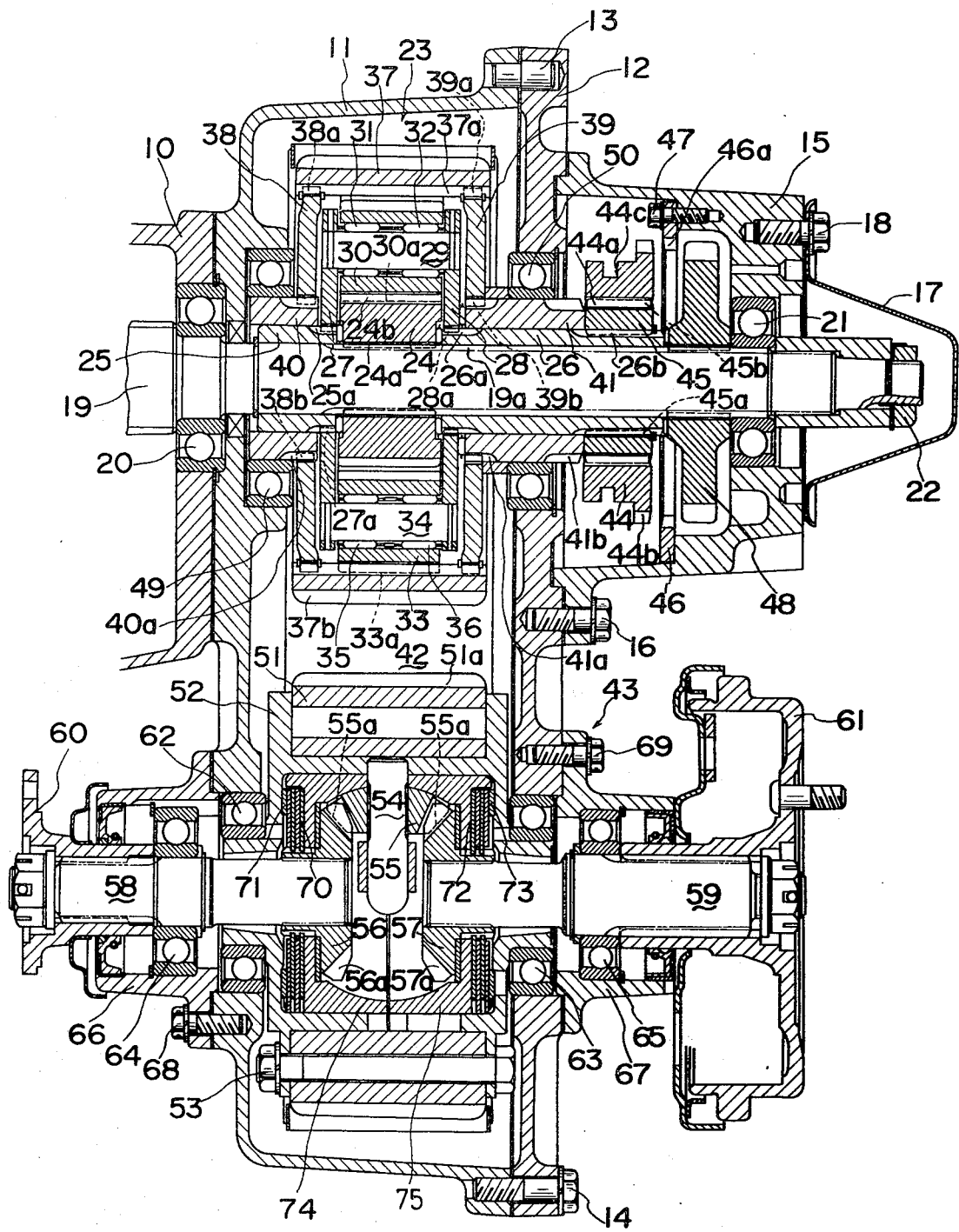
FIG. 1 is a cross-section view showing one embodiment of a power transmitting mechanism constructed according to the present invention and showing its cooperative parts.
Figure 2:
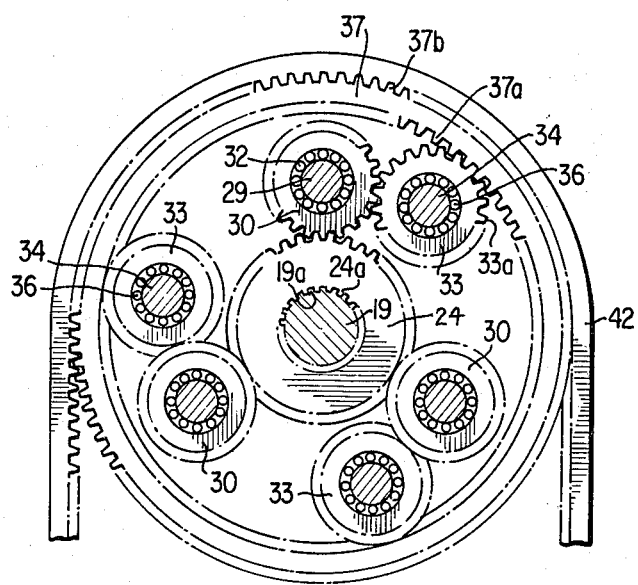
FIG. 2 is a cross-section view taken along line 2—2 of FIG. 1.

Referring now to the drawing, a main housing 10 of a conventional vehicle transmission has a casing 11 secured thereto by means of bolts, not shown. Secured to the casing 11 through means of pins 13 and bolts 14 is a cover 12 which, in turn, has connected thereto a bearing retainer 15 by means of bolts 16, the bearing retainer 15 having a dust cover 17 secured thereto through means of bolts 18. An output shaft 19 of the transmission extends through the housing 10, the casing 11, the cover 12 and the bearing retainer 15 and is journaled within bearings 20 and 21 which are retained within housing 10 and retainer 15 by means of a large portion of the output shaft 19 and a block 22, respectively.

Disposed within the casing 11 is a planetary gear mechanism, generally indicated by the reference character 23, an annular sun gear 24 being splined as at 24a so as to mate with splines 19a provided upon output shaft 19. Two tubular members 25 and 26 are disposed upon opposite sides of sun gear 24 and are slidably arranged upon the output shaft 19, splines 25a and 26a being respectively provided thereon so as to mesh with gear members 27a and 28a of annular carrier plates 27 and 28, respectively. A plurality of pinion shafts 29 have both their ends supported by means of the carrier plates 27 and 28, and rotatably mounted upon the shafts 29, through means of bearings 31 and 32, are first planetary pinion gears 30 which are provided with gear members 30a for meshing with a gear 24b of sun gear 24. Each of the pinion gears 30 also meshes with a corresponding gear of secondary planetary pinion gears 33 which are mounted, through means of bearings 35 and 36, upon a plurality of pinion shafts 34 which are also supported, at both their ends, by means of the carrier plates 27 and 28. The number of pinion gears 30 is the same as that of gears 33, and the second pinion gears 33 are provided with external gears 33a for meshing with an internal gear 37a provided upon a ring gear 37, the latter gear 37a also meshing with splines 38a and 39a respectively disposed upon annular disc plates 38 and 39. These disc plates 38 and 39 are splined as at 38b and 39b so as to mesh with splines 40a and 41a provided upon annular members 40 and 41 which are adapted to slide upon the tubular members 25 and 26, respectively.

Within the planetary gear mechanism 23 having the aforedescribed structure, the carrier plates 27 and 28 are rotatably disposed with respect to the shaft 19 through means of the tubular members 25 and 26, and are also arranged so as to support both sets of pinion gears 30 and 33. The mechanical connection between the output shaft 19 and the carrier plates 27 and 28 is selectively controllable, as will be more apparent hereinafter, whereupon the planetary gear mechanism 23 is able to accommodate different change speed adjustments, that is to say, the output of the same functions as two power trains of different speed ratios as required for certain adjustments of the transmission.

The output of the planetary gear mechanism 23 is transmitted to a chain 42 which is engaged with a sprocket wheel 37b which is provided upon the outer periphery of the ring gear 37, the chain 42 being associated with a differential gear mechanism, generally indicated by the reference character 43, as will be more apparent hereinafter. A change-over means or shiftable sleeve member 44 which is splined as at 44a so as to engage splines 45b of a hub 45, also includes a notch 44c which is adapted to be engaged by means of a shifter fork, not shown, for changing the speed adjustments of the transmission, the sleeve member 44 thus being adapted to be shifted toward the right or left upon the hub 45 from a neutral position to operative positions.

When the sleeve member 44 is moved toward the right, an external gear 44b is meshed with an internal gear 46a of a stationary ring 46 so as to prevent rotation of the sleeve member 44, which of course also results in preventing the hub 45 from rotating. The hub 45 also has splines 45a which engage with splines 26b of the tubular member 26, thus, the rightward movement of the sleeve member 44 also prevents the carrier plate 28 from rotating through means of the splines 26a and 28a. Under such conditions, rotational movement of the sun gear 24 is transmitted to the ring gear 37 through means of the pinion gears 30 and 33, or in other words, the torque from the output shaft 19 is transmitted to the ring gear 37 in response to the gear ratio between the sun gear 24 and the ring gear 37.

Similarly, when the sleeve member 44 is shifted toward the left by means of the fork, the splines 44a of the sleeve member 44 now mesh with splines 41b of the member 41 and also mesh with the splines 45b. As a result, the ring gear 37 is interconnected with the carrier plate 28 through means of the plate 39, the member 41, the sleeve member 44, the hub 45 and the tubular member 26. Consequently, the sun gear 24, the pinion gears 30 and 33, and the ring gear 37 are all rotated as a unit together with the output shaft 19 without any gear ration existing therebetween. The rotation of the output shaft 19 is thus transmitted to the differential gear mechanism 43 through means of the planetary gear mechanism 23 and the chain 42, the torque from the output shaft 19 not being increased or decreased.

In the instance that the sleeve member 44 is in the illustrated neutral position, if the ring gear 37 is subjected to a load from the differential gear mechanism 43 through means of the chain 42, the rotation of the sun gear 24 causes carriers 27 and 28 to rotate through means of pinion gears 30 and 33, and thus the member 26, the hub 45 and the sleeve member 44 are rotated. However, all of these components are merely rotated in an idle state because of the impressed load, and thus, the planetary gear mechanism 23 delivers no output torque when the sleeve member 44 is positioned in the neutral position. It should be noted that a gear 48 may be provided upon the output shaft 19 and that the gear 48 may be associated with suitable means, not shown, so as to thereby obtain the output for power take-off use, for example, for a crane. Accordingly, it is possible to obtain the output torque for the crane even if the sleeve member 44 is in its neutral position. Stationary ring 46 may of course be secured to the bearing retainer 15 by means of bolts 47 and the annular members 40 and 41 may be provided with bearings 49 and 50, respectively.

The construction and operation of the differential gear mechanism 43 will now be explained. Engaged with the chain 42 is a ring gear 51, having a gear tooth 51a, which is secured to a carrier 52 through means of bolts 53, and the carrier 52 supports pinion shafts 54 so that they may rotate as a unit. Pinions 55 of the bevel gear type, and having gear teeth 55a, are free to rotate upon the pinion shafts 54, and meshing with the pinions 55 are gear teeth 56a and 57a of two side gears 56 and 57, respectively, which are disposed within the housing in opposed relation with the side gear 56 being concentric with the inner end portion of a drive shaft 58 which is provided, for example, for driving the vehicle front wheels, not shown, while the side gear 57 is concentric with the inner end portion of a drive shaft 59 which is provided for driving the vehicle rear wheels, not shown. A flange 60 upon drive shaft 58 is connected to the front wheels through means of a propeller shaft, not shown, and a further differential gear means, also not shown, and likewise, the drive shaft 59 is connected to the rear wheels through means of a brake drum housing 61, a propeller shaft, not shown, and a further differential gear means, also not shown. The brake drum which is shown only by the housing 61 thereof is of course associated mechanically with a parking or hand brake, not shown, and as the brake drum is well known, a detailed explanation thereof will be omitted.

The carrier 52 is rotatably supported within the casing 11 and cover 12 by means of bearings 62 and 63 respectively, and the shafts 58 and 59 are rotatably supported through means of bearings 64 and 65 disposed within bearing retainers 66 and 67, respectively, which are secured to the casing 11 and the cover 12 by means of bolts 68 and 69, respectively. A multiple disc clutch 70 comprises alternate discs which are notched around their inner peripheries so as to engage the teeth of side gear 56, and intermediate discs which are similarly notched around their outer edges for engagement with splines formed upon a cam retainer 74. The cam retainer 74 engages the pinion shafts 54 through cam means, not shown, provided upon the retainer 74 and the pinion shafts 54 and is thus rotated with the pinion shafts 54. The clutch discs are permitted some axial movement relative to one another but they are normally biased tightly together by means of a dished spring 71 slidably interposed between the carrier 52 and the disc clutch 70. Another multiple disc clutch 72, dished spring 73, and cam retainer 75 are similarly disposed with regard to the pinion shafts 54 and the side gear 57, a differential locking mechanism thereby being constructed by means of the various elements mentioned above.

Thus, for example, when the vehicle is travelling in a straight line and the pinion gears 55 do not rotate relative to the carrier 52, the pinion gears 55 and the side gears 56 and 57 rotate together and both drive shafts 58 and 59 therefore rotate together at the same speed. Accordingly, the torque transmitted from the planetary gear mechanism 23 is transmitted to the drive shafts 58 and 59 through means of the ring gear 37, the chain 42, the ring gear 51, the carrier 52, the shafts 54, the pinion gears 55 and the side gear 56, and similarly through means of the ring gear 37, the chain 42, the ring gear 51, the carrier 52, the shafts 54, the pinion gears 55 and the side gear 57, respectively. At this time, the disc clutches 70 and 72 will not fulfill their locking functions because the frictional resistance forces existing between the discs of each of the clutches 70 and 72 will not be of the requisite magnitude.

Assuming however that one of the wheels loses traction, such as for example, when one of the wheels is on ice or the like, then a relative rotation between the shafts 58 and 59 will occur. In this manner, one of the drive shafts, for example, drive shaft 58, which is associated with the wheel having no traction rotates at a speed greater than the rotational speed of the carrier 52 while the remaining shaft 59 rotates at a slower speed than that of the carrier 52. As a result, the side gears 56 and 57 rotate relative to the retainers 74 and 75 so that substantial frictional resistance forces will be produced between the discs of the clutch 70 and between the discs of the clutch 72 by means of the dished spring 71 and 73. Furthermore, lateral movements of both retainers 74 and 75 occur due to such relative rotation, and such movements will then be increased by the cam means in a conventional manner. Thus, the clutches perform their locking functions between the discs so as to cause the shafts 58 and 59 to rotate with the carrier 52. The torque from the planetary gear mechanism 23 is now able to be transmitted to the shafts 58 and 59 through means of the retainer 74, the clutch 70 and the side gear 56 in addition to the torque transmitted as mentioned above, and also through means of the retainer 75, the clutch 72 and the side gear 57 in addition to the torque transmitted as mentioned above.

When the vehicle turns a corner, relative rotation between the shafts 58 and 59 will also occur, and under these conditions, wherein the difference in rotation between the shafts is comparatively low, the discs of the clutches 70 and 72 are arranged for sliding movement corresponding to the difference in rotation whereby the clutches 70 and 72 will not perform their locking functions. As will be clear from the description hereinbefore, the torque from the output shaft 19 of the transmission is transmitted to the differential mechanism 43 through means of the planetary gear mechanism 23, the sprocket wheel 37b provided upon the ring gear 37 of the planetary gear mechanism, and the chain 42, whereupon the same may then be distributed to the shafts 58 and 59.

Obviously, many other modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power transmitting mechanism for a vehicle comprising:

planetary gear means, disposed within a stationary casing of said vehicle and including fixed engaging means thereon, including a sun gear disposed upon an output shaft of a transmission so as to thereby receive a torque output from said transmission, first planetary pinion gears meshed with said sun gear, second planetary pinion gears meshed with said first planetary pinion gears, carriers which are adapted so as to support said first and second planetary pinion gears and a ring gear meshed with said second planetary pinion gears;

change-over means associated with said planetary gear means and said fixed means of said stationary casing for selectively controlling said planetary gear means so as to produce different torque outputs as required, whereby when said change-over means is engaged with said planetary gear means free from said fixed stationary casing means, said ring gear is rotatable in unison with said output shaft to directly transmit the torque from said output shaft to said ring gear, and when said change-over means is engaged with said fixed stationary casing means, said carriers are fixed relative to said output shaft so as to transmit the torque from said sun gear to said ring gear with a different ratio, a differential gear means opeatively associated with said planetary gear means for distributing the torque output from said planetary gear means to the vehicle wheel drive shafts and including a carrier and a ring gear secured thereto;

a chain interposed between said planetary gear means and said differential gear means;

a sprocket wheel provided upon said ring gear to said planetary gear means and engaged with said chain;

a second sprocket wheel provided upon said ring gear of said differential gear means also being engaged with said chain; and said ring gear of said differential gear means and said ring gear of said planetary gear means being positioned on respectively parallel axes in a substantially common place plane whereby the torque output from said planetary gear means is transmitted to said differential gear means through said chain.

2. A power transmitting mechanism as set forth in claim 1, wherein said differential gear means further comprises differential locking means for establishing a mechanical connection between said ring gear of said differential gear means and said drive shafts upon the occurrence of relative rotation between said drive shafts.

3. A power transmitting mechanism as set forth in claim 1, wherein:

said planetary gear means further includes tubular means meshed with said output shaft and with said carrier; and said change-over means includes a sleeve member meshed with tubular member and slidable thereon.

4. A power transmitting mechanism as set forth in claim 1, wherein:

said second planetary pinion gears are provided with external gears meshed with internal gears of said ring gear, the number of said external gears of said second planetary pinion gears being different from the number of said internal gears of said ring gear.

5. A power transmitting mechanism as set forth in claim 3, wherein said planetary gear means further includes:

annular means disposed upon said tubular means and
    disc plate means meshed with said annular means and with said ring gear,
    said sleeve member being engageable with said annular means so as to thereby interconnect said ring gear with said carrier through said disc plate means, said sleeve member, and said tubular member.

* * * * *